Nov. 30, 1937. C. C. ADELSPERGER Re. 20,559
CHAIR BACK
Original Filed March 11, 1932
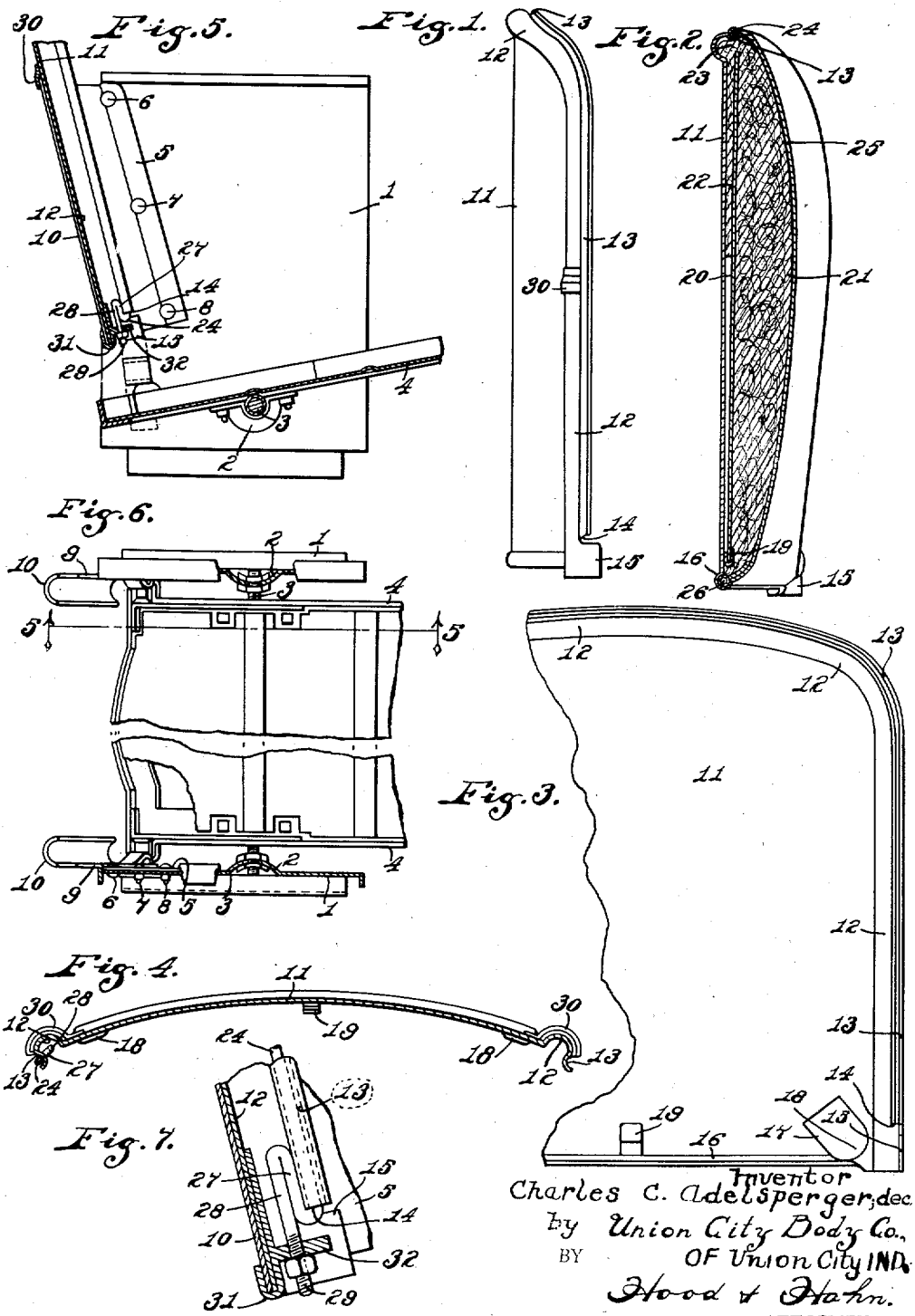
Inventor
Charles C. Adelsperger, dec.
by Union City Body Co.,
BY OF Union City IND.
Hood & Hahn.
ATTORNEYS.

Reissued Nov. 30, 1937

Re. 20,559

UNITED STATES PATENT OFFICE 20,559

CHAIR BACK

Charles C. Adelsperger, deceased, late of Union City, Ind., by Union City Body Company, assignee, Union City, Ind.

Original No. 1,994,162, dated March 12, 1935, Serial No. 718,594, April 2, 1934, which is a division of Serial No. 598,231, March 11, 1932. Application for reissue November 20, 1936, Serial No. 111,861

6 Claims. (Cl. 155—184)

The present invention relates to improvements in theater chairs and one of the objects of my invention is to provide a chair structure organized in such a manner that it may be shipped in a knocked-down condition.

A further object of my invention is to provide an improvement in a chair back, primarily adapted for association with the above-mentioned type of knocked-down chair, which may be cheaply and readily constructed, primarily of sheet metal, with means for securing the upholstery in position in the back, which means not only provides for a cheap and efficient manner for securing the upholstery in place, but also provides means whereby the upholstery may be renewed when worn out or destroyed with a minimum of expense.

For the purpose of illustrating my invention I have illustrated an embodiment thereof in the accompanying drawing in which Fig. 1 is a side elevation of a frame for a back unit embodying my invention;

Fig. 2 is a central section of an upholstered back unit;

Fig. 3 is a fragmental front elevation of a back unit frame;

Fig. 4 is a horizontal section thereof;

Fig. 5 is a longitudinal section on the line 5—5 of Fig. 6, showing in addition the back assembly;

Fig. 6 is a fragmental plan of a seat unit showing the back-retaining means, and Fig. 7 is an enlarged detailed view showing the means for securing the retaining bar in position in the frame.

In the embodiment of the invention illustrated I provide a pair of side plates 1 adapted to be secured to suitable standards and each of these side plates is provided with an inwardly-facing socket portion 2 adapted to receive the end of a cross bar 3, which cross bar provides means for connecting the side plates together, and a pivotal support for the tilting seat frame 4.

Each of the side plates 1 carries a back-supporting bracket 5 and each of said brackets comprises a plate secured to one of the side plates as by a rivet 6 passing through the upper end of the bracket and the plate and bolts or rivets 7 and 8 placed at spaced points on the bracket. Either the bracket plate 5 or the side plate may be formed of elongated apertures for the reception of the bolts 7 and 8 to provide for an adjustment of the angle of inclination of the back-supporting bracket.

Each bracket includes a rearwardly-extending portion 9 terminating in a partly cylindrical portion 10 as illustrated in Fig. 6, and it will be noted that these partly cylindrical portions face inwardly.

The back unit comprises a frame member 11 consisting of a sheet of metal generally of rectangular form, and curved as illustrated, and provided with a peripherally-extending bead 12 adjacent three of its edges. Beyond the bead portion 12 the said three edges of the sheet are formed to provide a continuous outwardly-opening groove 13, the portion of the sheet in which groove 13 is formed terminating in shoulders 14 at the bottom of the back, and the portion of the bead at its lower end being extended or projected to form a flange or tongue 15.

The fourth edge of the sheet is formed with a forwardly-opening groove 16 and adjacent each end of the groove the sheet 11 carries an ear 17, one end portion 18 of which is free. This ear is preferably spot-welded to the sheet and the free end portion 18 may be bent free of the sheet for a purpose more fully hereinafter appearing. Substantially midway of the sides of the sheet and adjacent the groove 16 is provided an upwardly-opening hook 19 which may also, if desired, be spot-welded in position.

A sheet 20 of flexible material, such as cardboard, is positioned with its lower edge supported in the hook 19. Compressible upholstering material 21, such for instance as hair or other padding, and preferably in sheet form, is supported on the cardboard sheet, a portion 22 of the material being folded over the upper edge of the cardboard and compressed between the cardboard sheet and the seat back. Likewise a portion 23 of the material may enter the cavity formed by the bead 12.

In this description and in certain of the claims appended hereto the material 20 is referred to as "cardboard". It is to be understood, however, that any material which is relatively inexpensive, light, and which has sufficient stiffness to support the strip of upholstering material 21 during the assembly of the back is to be considered the equivalent of the cardboard.

A resilient bar 24 is secured to three edges of a generally rectangular sheet 25 of covering material, preferably by having the edge of the sheet rolled over the bar and secured to the back of the material either by stitching or otherwise. A rod 26 is secured to the bottom or other edge of the upholstering material, and this rod may be positioned in the groove 16. After the positioning of the rod 26 the ends 18 of the ears 17 may be bent downwardly against the rod to retain the same in the groove. The bar 24 is positioned in the groove 13 and at each of its opposite ends this bar is provided with a bent portion 27 adapted to cooperate with the shoulders 14 to retain the bar in its groove. The bent portion 27 is again bent in the opposite direction to provide a stud 28 screw threaded as at 29 at its ends. After the rod has been assembled in the groove or recess, the extending lugs 15 are folded down to cover the rebent ends of the rod 24.

The assembled back unit is engaged with the seat unit by entering the lower ends of the bead 12 in the cylindrical portions 10 of the brackets 9 and sliding the back unit downwardly in said portions until the hooks 30 secured on the bead portions engage over the top edges of the cylindrical portions 10. This limits the downward movement of the back and also provides a covering for the raw edge of the curved portion 10 of the bracket. The lower edges of the bracket and bead are covered by cap members 31 which engage over the lower edges of the curved portions 10 and the bead, as illustrated in Fig. 7, and these cap portions are provided with lugs 32 through which extend the threaded ends 29, nuts being secured on the under side of the lugs 32 for drawing the bar 24 snugly in position, and likewise holding the back portion from vertical displacement.

The present application is a division of my copending application Serial No. 598,231, filed March 11, 1932.

What is claimed is:

1. In a chair, a back comprising a sheet of metal of generally rectangular formation, said sheet being formed with an outwardly opening groove extending around three sides thereof, said groove terminating, at its opposite ends, in shoulders and a resilient bar positioned in said groove and provided at its opposite ends with abutments engageable with said shoulders to hold said bar in place.

2. In a chair, a back comprising a sheet of metal of generally rectangular formation, said sheet being formed with an outwardly opening groove extending around three sides thereof, said groove terminating, at its opposite ends, in shoulders, a resilient bar positioned in said groove and provided at its opposite ends with abutments engageable with said shoulders to hold said bar in place, and a sheet of flexible covering material substantially coextensive in size with the sheet metal having a portion of its periphery secured to said bar.

3. In a chair, a back comprising a sheet of metal of generally rectangular formation, said sheet being formed with an outwardly opening groove extending around three sides thereof, said groove terminating, at its opposite ends, in shoulders, a resilient bar positioned in said groove and provided at its opposite ends with abutments engageable with said shoulders to hold said bar in place, a groove formed in said metal sheet and extending along the fourth side thereof, a pair of spaced ears secured to said metal sheet adjacent said last-mentioned groove, a sheet of flexible covering material of generally rectangular formation having three sides secured to said bar and a rod receivable in said last-mentioned groove, the fourth side of said flexible sheet being secured to said rod, said ears being adapted to be bent into retaining relation with said rod to hold the same in position in said last-mentioned groove.

4. In a chair, a back comprising a sheet of metal of generally rectangular formation, said sheet being formed with an outwardly opening groove extending around three sides thereof, said groove terminating, at its opposite ends, in shoulders, a resilient bar positioned in said groove and provided at its opposite ends with abutments engageable with said shoulders to hold said bar in place, a lug carried by said sheet adjacent its fourth side, a plate of cardboard supported on said lug, a sheet of compressible upholstering material folded over the upper edge of said plate and carried thereby, a groove formed in said metal sheet and extending along the fourth side thereof, a pair of spaced ears secured to said metal sheet adjacent said last-mentioned groove, a sheet of flexible covering material of generally rectangular formation having three sides secured to said bar and a rod receivable in said last-mentioned groove, the fourth side of said flexible sheet being secured to said rod, said ears being adapted to be bent into retaining relation with said rod to hold the same in position in said last-mentioned groove.

5. A chair structure comprising an upholstery carrying member generally rectangular in form and formed with an outwardly opening groove extending around at least three sides thereof, a resilient member positioned in said groove, means engaging the free ends of said resilient member for drawing said resilient member snugly into said groove and placing the same under tension therein, and a sheet of flexible covering material substantially co-extensive in size with said carrying member and having a portion fitting within said groove and embraced by said resilient member.

6. A chair structure comprising an upholstery carrying member generally rectangular in form and formed with an outwardly opening groove extending around at least three sides thereof, a resilient member positioned in said groove the free ends of said resilient member being screw-threaded, threaded members engaging said free ends for drawing said resilient member snugly into said groove and placing the same under tension, means for holding said threaded members against movement at least in one direction relative to the respective threaded ends of the resilient member, and a sheet of flexible covering material substantially co-extensive in size with said carrying member having a portion fitting within said groove and embraced by said resilient member.

UNION CITY BODY CO.,
*Assignee of Charles C. Adelsperger, Deceased.*
By HEBER D. FITZGERALD,
*President.*